United States Patent
Rasmussen

(10) Patent No.: US 11,829,431 B2
(45) Date of Patent: *Nov. 28, 2023

(54) SYSTEM AND METHOD FOR ANALYZING, ORGANIZING, AND PRESENTING DATA STORED ON A MOBILE COMMUNICATION DEVICE

(71) Applicant: ModeOne Technologies Inc., Newport Coast, CA (US)

(72) Inventor: Matthew Rasmussen, Newport Coast, CA (US)

(73) Assignee: ModeOne Technologies Inc., Tustin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/686,323

(22) Filed: Mar. 3, 2022

(65) Prior Publication Data

US 2022/0188367 A1    Jun. 16, 2022

Related U.S. Application Data

(63) Continuation of application No. 16/826,149, filed on Mar. 20, 2020, now Pat. No. 11,301,529, which is a continuation of application No. 16/534,197, filed on Aug. 7, 2019, now abandoned.

(51) Int. Cl.
*G06F 7/02* (2006.01)
*G06F 16/00* (2019.01)
*G06F 16/9535* (2019.01)
*G06F 16/9538* (2019.01)
*G06F 16/955* (2019.01)

(52) U.S. Cl.
CPC ...... *G06F 16/9535* (2019.01); *G06F 16/9538* (2019.01); *G06F 16/9558* (2019.01)

(58) Field of Classification Search
CPC ............. G06F 16/9535; G06F 16/9558; G06F 16/9538
See application file for complete search history.

(56) References Cited

U.S. PATENT DOCUMENTS

| | | | |
|---|---|---|---|
| 9,645,996 B1 * | 5/2017 | Ledet | G06F 40/117 |
| 9,760,556 B1 * | 9/2017 | Knudson | G06F 40/134 |
| 11,227,017 B2 * | 1/2022 | Schaer | G06F 3/0482 |
| 2013/0212090 A1 * | 8/2013 | Sperling | G06F 16/9535 |
| | | | 707/723 |
| 2017/0364371 A1 * | 12/2017 | Nandi | G06F 16/287 |
| 2018/0322213 A1 * | 11/2018 | Brown | G06F 16/951 |

* cited by examiner

*Primary Examiner* — Bruce M Moser
(74) *Attorney, Agent, or Firm* — Lynch LLP; Sean Lynch

(57) ABSTRACT

A system and method is provided for receiving, analyzing, organizing and presenting data stored on a mobile communication device. In one embodiment of the present invention, the data is organized by application-type and is searchable. In one embodiment, the system may be configured to generate first and second search results from a first search term entered by a reviewer, where the first search result includes at least a first record from a first application, the second search result includes at least a second record from a second application, and both records are displayed to the reviewer at the same time. In performing the search, the first record should match the first search term and the second record should match a second search term, where the second is identified by the system and is related to but different from the first search term.

20 Claims, 17 Drawing Sheets

| Name (412a) | Location (412b) | Application (412c) | ID (412d) | Topic (412e) | Reviewed (412f) | Reviewer (412g) |
|---|---|---|---|---|---|---|
| Photo_1 | C:/location_1 | Photo | 1234 | Privileged | Reviewed | Kevin |
| Message_1 | C:/location_2 | Message | 1234 | None | Not Reviewed | Kevin |
| Message_2 | C:/location_2 | Message | 1235 | None | Not Reviewed | Kevin |

400

| Name (802a) | Phone (802b) | Email (802c) | Address (802d) | Gov. ID (802e) | Financial (802f) | WhatsApp (802g) |
|---|---|---|---|---|---|---|
| Ardy | 555-123-4567 | ardy@yahoo | 123 State St. | B1234567 | Visa 4567 | A. Akbar |
| Doug | N/A | doug@hotmail | N/A | 555-55-5555 | Zelle No. | N/A |
| Nacho | 555-234-5678 | N/A | 345 Main St. | N/A | Paypal No. | Ignacio |

SYSTEM AND METHOD FOR ANALYZING, ORGANIZING, AND PRESENTING DATA STORED ON A MOBILE COMMUNICATION DEVICE

This application is a continuation of and claims priority to U.S. patent application Ser. No. 16/826,149, filed Mar. 20, 2020, which is a continuation of U.S. patent application Ser. No. 16/534,197 filed Aug. 7, 2019. All extrinsic materials identified in this application are incorporated by reference in their entirety.

FIELD OF THE INVENTION

The present invention relates to eDiscovery, and more particular to a system and method for receiving, analyzing, and organizing data stored on a mobile communication device (e.g., text messages, phone logs, photos, social media data, etc.) and presenting that data in a user-friendly fashion. For example, the data should be searchable and individual records should be presented in context, which may involve displaying related records within a single application and amongst different applications.

BACKGROUND

The background description includes information that may be useful in understanding the present invention. It is not an admission that any of the information provided in this application is prior art or relevant to the presently claimed invention, or that any publication specifically or implicitly referenced is prior art.

As more and more people are using mobile phones to communicate both professionally and personally, Mobile Phone Discovery (MPD) is an industry on the rise. By way of example, it was estimated that in 2018, over $10B were spent on eDiscovery software and services, and by the year 2023, this number is expected to exceed $23B. This increase is due to several factors, including costs and expenses for developing new technology, marketplace expansion, and the number of communication devices in use.

For example, with respect to marketplace expansion, the #metoo movement, employment disputes, investigations (HR, law enforcement, etc.), compliance monitoring, and responses to litigation are causing a dramatic increase in the need for eDiscovery. eDiscovery is essentially software that can be used to receive, analyze, organize, and present data stored on a mobile phone. Examples of such data include messaging data (e.g., text messaging), telephone data, photo data, data for social media applications (e.g., Twitter, Instagram, Facebook, WhatsApp, etc.), etc.

Not only is the marketplace expanding, but so too are the number of mobile communication devices. There is a steep increase in the number of mobile phones that are being used, as well as other mobile communication devices, such as tablets, laptops, etc.

While software for processing data stored on a personal computer (PC) can be used with mobile devices, the results are less than desirable. This is because traditional discovery software treats each file (e.g., an email, a Word document) as a stand-alone record, whereas on mobile devices, records are much more interrelated. For example, a text message does not exist in a vacuum but is instead part of a much larger record, generally referred to as a "thread." Similarly, when one is using a social media application, such as Facebook or Twitter, individual communications are part of the user's Page or account. In other words, unlike a PC, files on mobile devices are interrelated. When viewed together, they can provide a nice "snapshot" of the user's activities.

Thus, there is a need for a system and method that addresses the issues and problems with traditional discovery software. In particular, there is a need for software that can receive, analyze, organize, and present data that is traditionally stored on mobile communication devices, such as text messages, social media communications, etc. There is also a need to present such data in a user-friendly manner, allowing the reviewer to easily navigate, easily annotate (e.g., tag, etc.), and provide context to individual records. It would also be beneficial to use artificial intelligence (AI) to "tell a story," which may involve displaying data that is related, both within an application and amongst different applications.

SUMMARY OF THE INVENTION

The present invention is directed toward the receiving, analyzing, organizing, and displaying of data stored on a mobile communication device (e.g., text messages, phone logs, photos, social media data, etc.). Preferred embodiments of the present invention operate in accordance with a Web host in communication with a mobile communication device, such as a mobile phone, via a wide area network (WAN). In one embodiment of the present invention, a local computer (e.g., a personal computer) is connected to the mobile device and configured to receive the data stored on the mobile device. This data is then transferred to the Web host, either directly (e.g., by providing the data directly to the Web host) or indirectly (e.g., by providing the data to the Web host via a networked computer, such as a server). In other embodiments, Web host software (or a portion thereof) is loaded onto the local computer, allowing the data to be analyzed, organized, and presented on the local computer.

Regardless of whether the present invention is operating locally or remotely, the reviewer will have an opportunity to navigate, interact with, and organize data that was previously stored on the mobile communication device. This may involve known navigation techniques, such as browsing and/or searching.

Data (or individual records) on mobile devices are generally associated with either the operating system or applications that are operating on the mobile device. As such, the system may first identify applications that are operating on (or accessible via) the mobile device. Such applications may include, for example, a messaging application, a phone application, an email application, a photo application, and other third-party applications (e.g., Instagram™ Facebook™, Twitter™, WhatsApp™, etc.). Once the applications are identified, the data (or individual portions thereof) (e.g., files, records, etc.) can then be associated (or linked) with at least one application.

Once the individual records are organized (e.g., associated with an application), the user can then browse by selecting an application of interest. For example, if the phone application is selected, then the reviewer may be presented with a phone log, which may provide information on each call, such as incoming, outgoing, answered, rejected, name, number, date, time, duration, etc. If the message application is selected, then the reviewer may be presented with message data, which may include individual threads having individual records or messages. The reviewer may also be provided with information on each record, including, but not limited to, the record's content, to, from, date, time, read, unread, etc. If the photo application is selected, then the reviewer may be presented with photo data, which may include individual photos, along with information on each photo (e.g., file size, location, date, time, whether the photo was edited, whether the photo was shared, and if so, to whom and when, etc.). Finally, if a social media application is selected, then the reviewer may be presented with data for that application, which may include photos, messages, or other data created, received, or shared using the application.

In one embodiment of the present invention, data is not presented to the user in isolation, but in context. In other words, when analyzing data stored on a personal computer, reviewing a Word document along with its metadata may be sufficient to understand the document, including its content, when it was created, when it was edited, etc. However, a text message may not make any sense until the message is viewed in context, which may involve reviewing preceding messages, successive messages, messages involving the same participates on other applications, etc. For example, Don, Mary, and Paul may be texting each other while Don and Mary are also instant messaging each other on Facebook™. Unlike traditional records on a personal computer, these mobile records may only make sense when viewed together, preferably at the same time (e.g., side-by-side, etc.). As discussed in greater detail below, this may involve identifying related records, which may involve identifying and analyzing identifiers for each record (e.g., a record ID, a thread ID, etc.), associated data (e.g., data that links multiple terms together), etc.

When reviewing the data, the reviewer may be allowed to annotate each record by selecting at last one "tag" from a plurality of tags, where each tag has a separate meaning. For example, a tag could show whether a file was reviewed, not reviewed, responsive to a discovery request, non-responsive, responsive to a particular topic (e.g., a particular discovery request, a particular investigative issue, etc.), privileged (e.g., attorney-client, work product, etc.), non-privileged, etc. In addition, or alternatively, tags can be automatically selected by the system (e.g., reviewed, not reviewed, presented for review, reviewer's name, review date, review time, review device, etc.). Each tag can be associated with a record or a plurality of records (e.g., a thread, etc.). Once a tag has been selected, it will then be associated with the record for which it was selected.

As previously discussed, a reviewer may also search the data for at least one search term (e.g., name, subject, date, etc.). Results may include records that match or are closely related (e.g., similar, abbreviations, etc.) and may be performed global (i.e., on all the data) or on data for individual applications. For example, if a reviewer enters the name "Mary" in a search field, then the system may provide search results, which may be from one application or many applications.

As discussed above, the present invention may also be configured to present records (such as search results) in context. This may be done either automatically or selectively (e.g., by selecting the "story telling" feature). For example, if a message is responsive to a search term, then the system may present the reviewer with at least one preceding message and at least one succeeding message from the same application. The system may also present the reviewer with at least one related record from another application. This may include a record involving the same person, involving the same or similar subject matter, was received/sent immediately before, immediately after, etc.

For example, a search result for "Mary and store" may return a message from Mary asking Tom whether he's ready to go the hardware store. In order to put the message in context, this message may be displayed together with a preceding message (e.g., from Tom asking Mary whether she's ready to go) and a succeeding message (e.g., from Tom stating that he'll meet her at Home Depot at 3:00). The message may also be displayed together with other records, from other applications, such as other messages between Tom and Mary, other messages mentioning Mary, Web browser activity around the time the message was received, Uber™ activity around the time the message was received, etc. Data like this may help the reviewer understand the search results by putting them in context.

In order to find related records (e.g., tell a story), it may be necessary to build a database, linking data from different applications together. For example, assume that system is searching for "Ardy." The system may identify text messages that are to or from Ardy and social media involving Ardy. However, the system may also be configured to collect and organize information about Ardy, which may be extracted from various applications and/or records. For example, a contact record on Ardy may include his phone number, his email address, and his mailing address, and other records stored on the mobile device may include (or show) other identifiers, such as his date of birth, government issued ID, financial information, etc. While processing the data stored on the mobile device, the system may also learn that some of these identifiers are also linked to a user by the name of A_Akbar on WhatsApp, and to a user by the name Camp_Clown on Facebook. This collection of information (e.g., in a database) can then be used to identify related records. For example, a system search for "Ardy" may also pull up records for A_Akbar and Camp_Clown.

A more complete understanding of a system and method for receiving, analyzing, organizing, and presenting data stored on a mobile communication device, and presenting that data in a user-friendly fashion, will be afforded to those skilled in the art, as well as a realization of additional advantages and objects thereof, by a consideration of the following detailed description of the preferred embodiment. Reference will be made to the appended sheets of drawings, which will first be described briefly.

BRIEF DESCRIPTION OF THE DRAWINGS

FIGS. 20 and 21 provide exemplary screen shots, illustrating how message data may be presented in accordance with various embodiments of the present invention.

DETAILED DESCRIPTION

The present invention is described as a system and method for processing (receiving, analyzing, organizing, presenting, etc.) data stored on a mobile phone. It should be appreciated, however, that the present invention is not limited to the processing of data for any particular purpose, such as litigation (e.g., responding to discovery requests, etc.). It may also be used as an investigative tool (e.g., by human resources, law enforcement, etc.), a compliance tool, or for personal reasons.

For example, a user generally goes through several mobile phones during their life and may need to review data stored on a device to ensure that data of interest is not lost. The present invention can be used as a tool to easily navigate through data stored on a computing device, regardless of the user's objective or the interest at issue. By way of another example, the present invention could be used in an official capacity, e.g., by law enforcement, to investigate a user's actions and activities (e.g., during a particular time, involving a particular individual, regarding a particular offense, etc.).

It should also be appreciated that the present invention is not limited to data stored on mobile phones. While mobile phones are used herein to illustrate the present invention, the technology is equally applicable to other mobile (and non-mobile) devices, such as tablets, laptops, etc. This is because, it is not the device that gives rise to the present invention, but the data that is stored thereon. In other words, the present invention is instrumental for processing the types of data that are generally stored on mobile devices, such as text messages, social media data, etc. However, as technology advances, it is not uncommon for such data to also be stored on other devices, such as tablets, PCs, etc. For this reason, the present invention is not limited to mobile phones, and is equally applicable to other communication devices, both mobile and non-mobile.

A detailed description of the present invention will now be provided. During this discussion, it should be appreciated that like element numerals are used to describe like elements illustrated in one or more figures.

Figure 1:
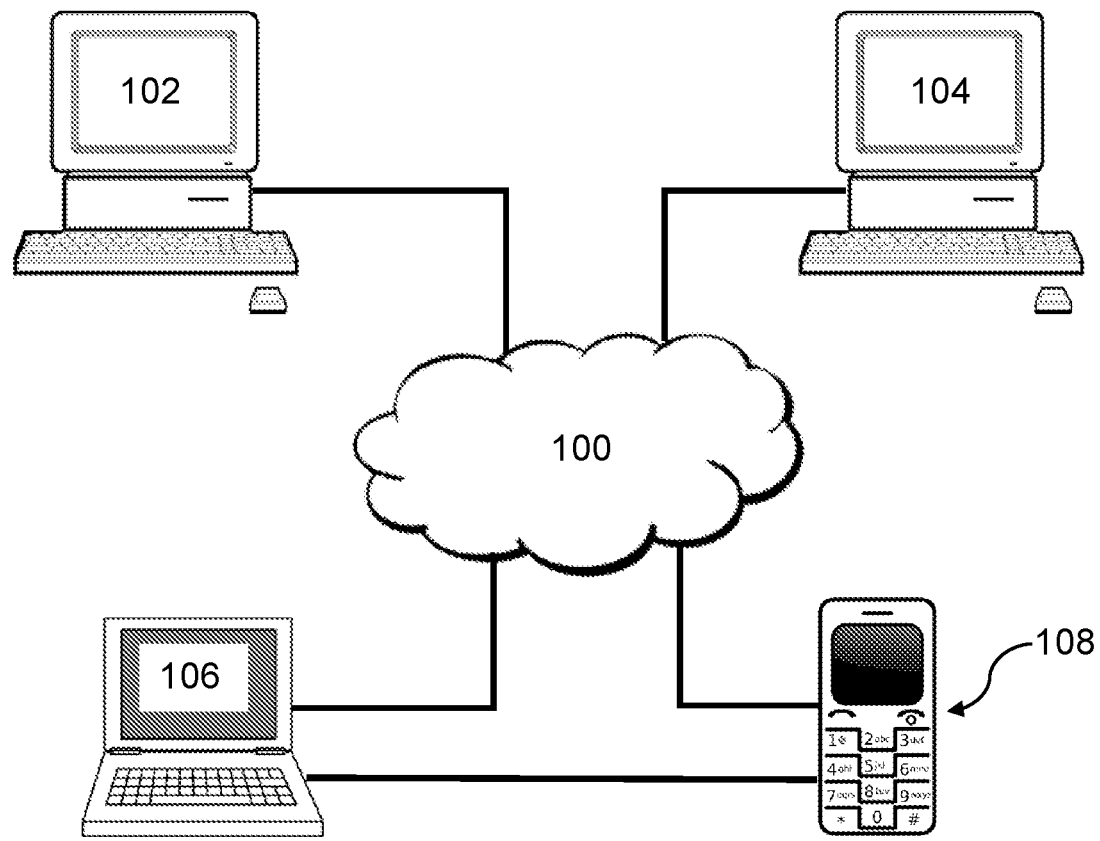
FIG. 1 illustrates a Web host in communication with a mobile communication device, either directly via other devices (e.g., a PC, a cloud service, etc.), via a wide area network (WAN), allowing the Web host to receive data stored on the mobile communication device.

As shown in FIG. 1, preferred embodiments of the present invention operate in accordance with a Web host 102 in communication with a mobile communication device 108, such as a mobile phone, via a wide area network (WAN) 100. In one embodiment of the present invention, a local computer 106, such as a personal computer (PC), is connected to the mobile device 108 either directly or via the WAN 100. During this connection, the data is transferred from the mobile device 108 to the computer 106, either at the direction of the mobile device 108 (e.g., uploaded) or the computer 106 (e.g., downloaded). The data is then provided to the Web host 102 via the WAN 100. This can be accomplished either directly, by providing the data directly to the Web host 102 via the WAN 100, or indirectly, by providing the data to a networked computer 104, such as a remote server, via the WAN 100. With respect to the latter, the data would then be provided to the Web host 102 (e.g., via the WAN, etc.), which again can be accomplished either at the direction of the networked computer 104 (e.g., uploading) or the Web host 102 (e.g., downloading).

While FIG. 1 depicts the preferred embodiment, it should be appreciated that other embodiments are within the spirit and scope of the present invention. For example, the networked computer 102 may be a backup device for the mobile device 108, such as Apple's iCloud™ Google Cloud™, or Verizon's Backup Assistant™, which may communicate (constantly, periodically, etc.) with the mobile device 108, and be in a position to provide the Web host 102 with an exact copy of the data stored on the mobile device 108. By way of another example, host software could be operating on the local computer 106, which would allow the present invention to function offline (e.g., without a WAN, such as the Internet), on the local computer 106.

It should also be appreciated that the present invention is not limited to the devices that are depicted in FIG. 1 and described herein. For example, the mobile communication device 108 may be any computing device (as discussed above), mobile or otherwise, the local computer 106, may be a desktop, a laptop, or any other computing device, and the networked computer 104 and/or the host computer 102 may include a plurality of devices (computers, servers, memory devices, etc.) operating in concert. By way of another example, the WAN 100 may be a local area network (LAN) or non-existent if host software is operating on the local computer 106. In this case, the communication channel between the local computer 106 and the mobile device 108 can be any wired or wireless technology generally known to those skilled in the art. Thus, while preferred ways of receiving data have been discussed herein, the present invention is not so limited.

It should also be appreciated that additional computers (e.g., networked computers) (not shown in FIG. 1) are also within the spirit and scope of the present invention. For example, once the data has been loaded onto (or accessible by) the Web host device 102, a reviewer may use a different, remote computer to log into the Web host application, select a device (or data stored thereon), and navigate through the selected data (e.g., browse, search, etc.). Other reviewers may login via other remote computers. Once the data has been annotated, results (e.g., records identified as responsive, reports, etc.) can then be provided to an individual (e.g., third party) via another remote computer. The results can be provided in annotated form (e.g., making them easier to review) or in raw form (e.g., ensuring that the data has not been altered).

Figure 2:
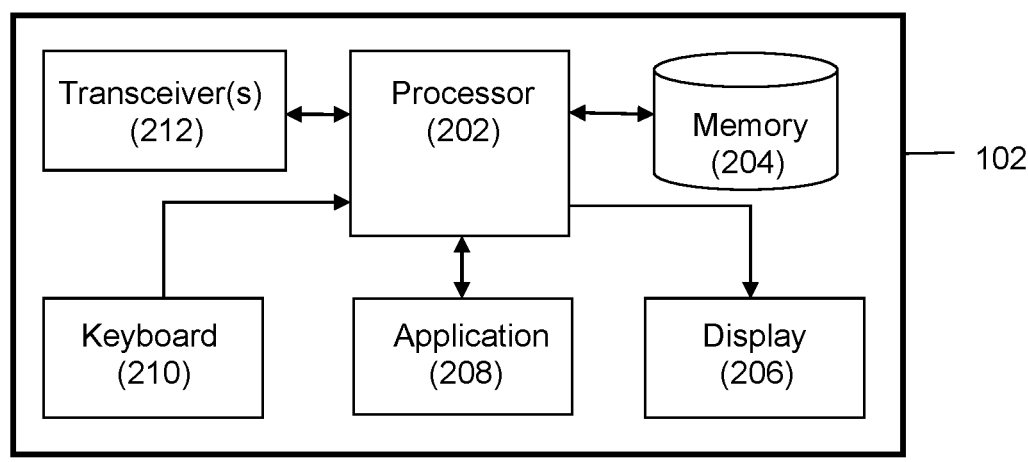
FIG. 2 illustrates one embodiment of the Web host depicted in FIG. 1.

In one embodiment of the present invention, as shown in FIG. 2, the host 102 may include at least one transceiver 212 (e.g., a network connection, etc.), at least one memory device 204 (e.g., hard drive, RAM, RAID, etc.), at least one processor 202, and at least one application or program 208, which may or may not be stored in the memory device 204. The host 102 may also include at least one input device 210, such as a keyboard, mouse, etc., and at least one output device 206, such as a display. If the host 102 is providing a service to a plurality of clients, the input/output would allow a staff member to access the system to provide updates, maintenance, customer support, etc. If the host 102 is operated by a client (e.g., host software operating on a local computer), the input/output would allow a reviewer to receive, review, and interact with the data (e.g., tag, run reports, etc.), as discussed in greater detail below.

It should be appreciated that the present invention is not limited to FIG. 2, and a host that includes fewer, greater, or different components is within the spirit and scope of the present invention. For example, a memory that is external to the Web host device is within the spirit and scope of the present invention. It should also be appreciated that FIG. 2 is equally applicable to the networked computer, the local computer, and the mobile communication device, as depicted in FIG. 1. For example, a local computer operating host software may include at least one transceiver (e.g., network connection, USB, Bluetooth, NFC, etc.), at least one memory (e.g., RAM, ROM, etc.), a processor, at least one application (e.g., a program for receiving and processing mobile data), etc. Similarly, the mobile communication device may include at least one transceiver (e.g., micro-USB, Bluetooth, NFC, cellular transceiver, etc.), at least one memory, a processor, at least one application (e.g., text message application, phone application, camera application, social media application, etc.), etc. It should be appreciated, however, that while the local computer or the mobile communication device may include components that are similar (or identical) to those depicted in FIG. 2, the present invention is not so limited. For example, a mobile communication device that includes fewer, greater, or different components is within the spirit and scope of the present invention.

Regardless of whether the present invention is operating locally (e.g., on a personal computer, etc.) or remotely (e.g., on a Web host, etc.), the client (referred to herein as the reviewer) will have an opportunity to navigate, interact with, and organize the data that was previously stored on the mobile communication device. The present invention will now be described using exemplary screen shots of what may be presented to the reviewer. It should be appreciated that these screen shots are merely exemplary and are not limitations of the present invention. They merely illustrate how the present invention may function. The present invention includes features that are not dependent on design (e.g., shape, size, layout, etc.). Thus, a system that provides any of the features discussed below, is within the spirit and scope of the present invention, regardless of how those features are presented to the reviewer.

Figure 3A:
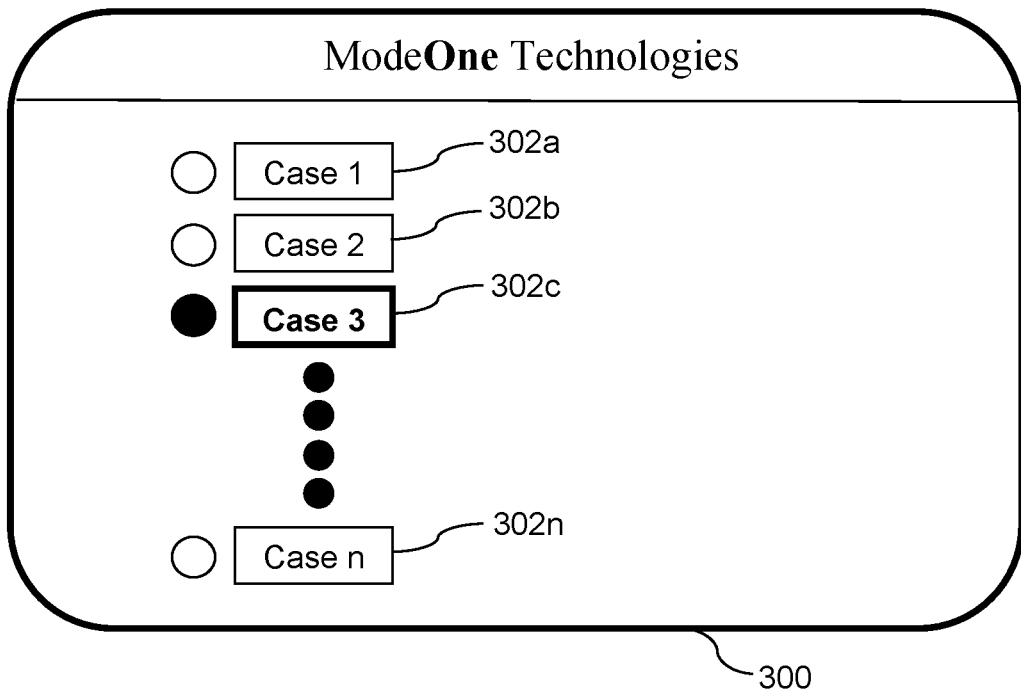
FIGS. 3A and B provide exemplary screen shots in accordance with one embodiment of the present invention, showing that different cases may include different devices having different data that can be reviewed (e.g., via browsing, searching, etc.)
Figure 3B:
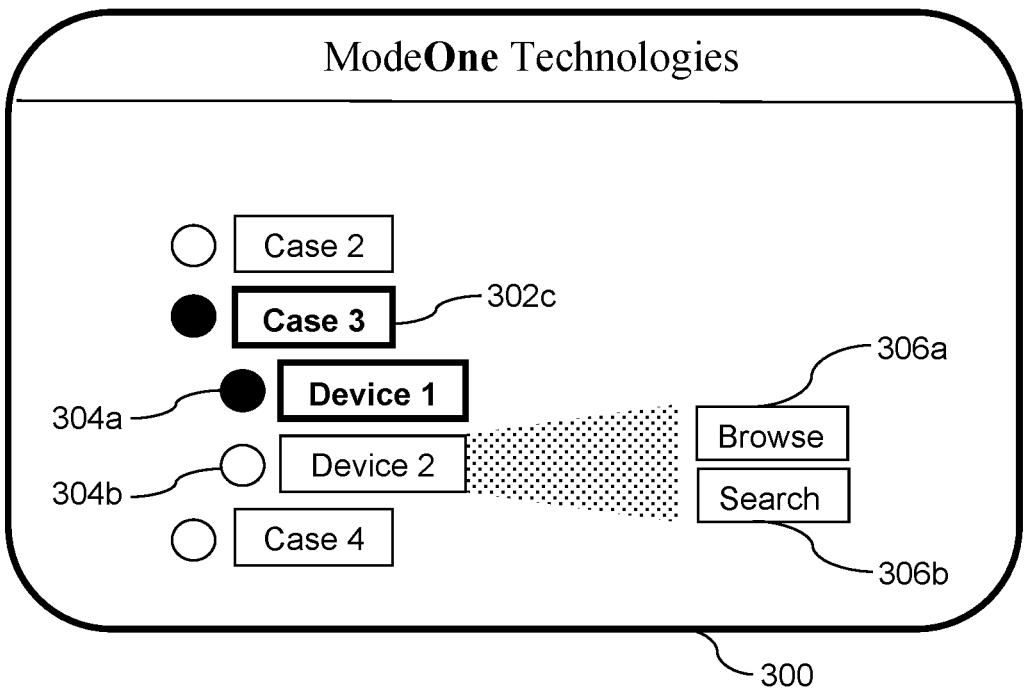
Figure 15:
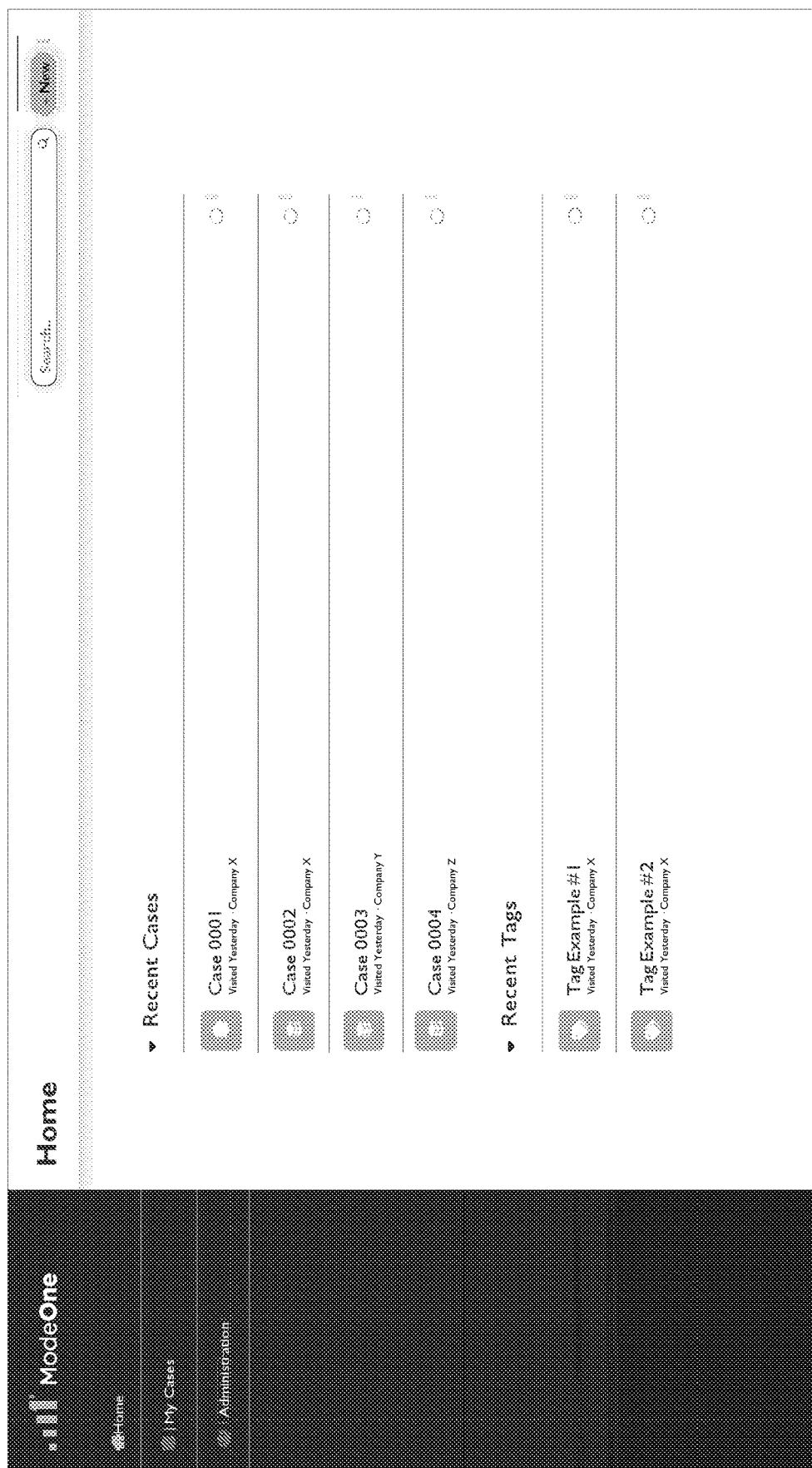
FIG. 15 provides an exemplary "home" screen shot in accordance with one embodiment of the present invention.

In one embodiment of the present invention, as shown in FIG. 3A, a client may have multiple cases loaded into (e.g., stored on) the system. See also FIG. 15. For example, there may be a first case 302a for a pending litigation, a second case 302b for an ongoing investigation, etc. Upon logging in, the client may be presented with a list of cases that are associated with (e.g., available to) the client (e.g., 302a, 302b, 302c, 302n) and allowed to select at least one case (e.g., 302c) from the list. The client may then be presented with a list of devices that are associated with that case (e.g., 304a, 304b). For example, a first device 304a may be the plaintiffs mobile phone, the second device 304b may be the defendant's PC, etc. The client may then be allowed to select at least one device (e.g., 304a) from the list. The client may also be presented with different ways of navigating the data, including browsing 306a or searching 306b. It should be appreciated that other navigational techniques are within the spirit and scope of the present invention. For example, a client may browse by other fields (e.g., by tag, reviewer, etc.). See, e.g., FIG. 15.

Once a device has been selected, if selection is necessary, data stored on that device is presented to the client for review (hence, the term "reviewer"). This "presentation" can be done in a number of ways. In one embodiment of the present invention, the system presents the reviewer with a plurality of applications that are associated with the data. This can be seen in FIG. 4A, where the mobile device includes data from a plurality of applications 402, including message (e.g., text messaging), phone, email, photo (e.g., camera), Instagram™, Facebook™, Twitter™, and WhatsApp™ applications. Identifying the applications that are on (or accessible via) the mobile device can be done in a number of ways, including analyzing applications (or programs), folders, and/or files that are stored on the mobile device. In fact, many operating systems are adapted to present the user with applications that are operating on their device in the "settings" menu. This same menu can be accessed by the system to identify applications that are operating on the mobile device.

Once the categories (e.g., applications) are identified, the data (or individual portions thereof) (e.g., files, etc.) can then be linked (or associated) with at least one category. This can be done in a number of ways, including analyzing the folder where the file was stored (e.g., an email file may be stored in an email folder, etc.) and/or analyzing the file itself (e.g., file type, structure, content, etc.) (e.g., a .doc file designates a Word document, etc.). Once the individual files are linked (or associated) with a particular application, the user can then browse by selecting an application of interest.

Figure 4A:
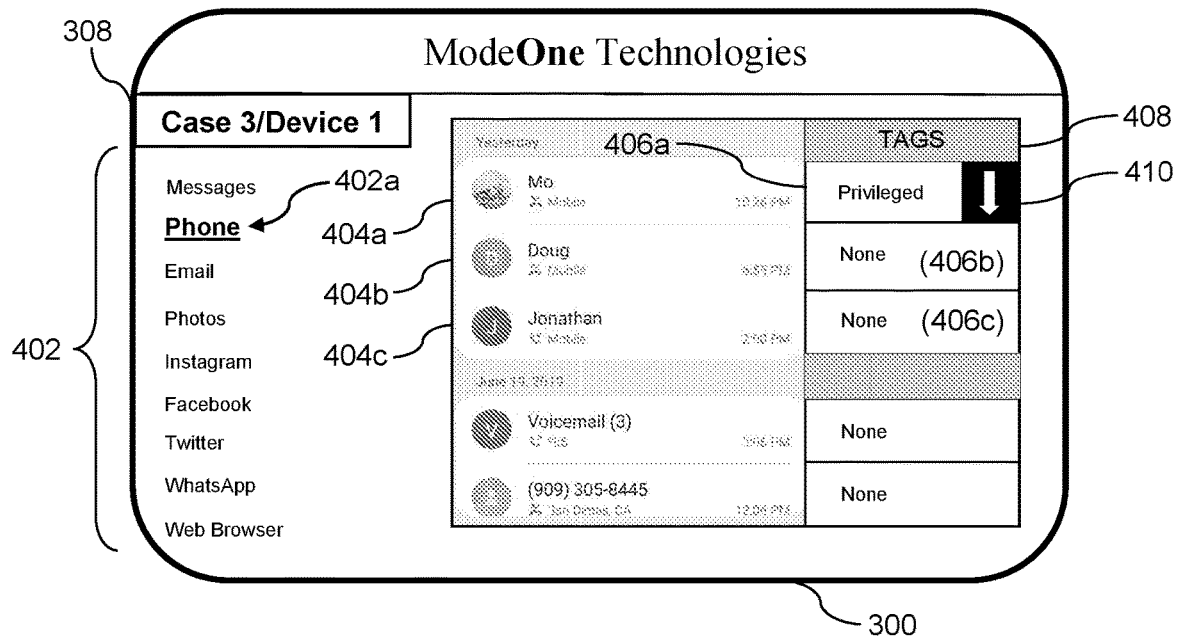
FIG. 4A provides an exemplary screen shot of phone data in accordance with one embodiment of the present invention.

For example, as shown in FIG. 4A, if the reviewer selects the "phone" category or application 402a, they will be presented with phone data, which may include a phone log. The log may provide information on each call (or record), including, but not limited to, incoming, outgoing, answered, rejected, voicemail, voicemail content, name, number, date, time, duration, etc. This information may either be presented along with each record or separately (e.g., in a pop-up window) if a particular record is selected (e.g., by clicking on a record, placing a pointer over a record, etc.). The records may be organized chronologically, or in some other fashion. For example, as shown in FIG. 4, a first record 404a shows that "Mo" called on Jun. 18, 2019, at 10:26 PM, and that call was not answered. A second record 404b shows that "Doug" called on Jun. 18, 2019, at 6:55 PM, and that call was not answered. A third record 404c shows that "Jonathan" called on Jun. 18, 2019, at 2:00 PM, and that call was answered. As discussed above, additional information may be provided (e.g., duration, was a voicemail left, what was the content of the voicemail, etc.).

When reviewing the data, the reviewer may be allowed to annotate each record by selecting at least one "tag" from a plurality of tags, where each tag has a separate meaning. For example, a tag could show whether a file was reviewed, not reviewed, responsive to a discovery request, non-responsive, responsive to a particular topic (e.g., a particular discovery request, a particular investigative issue, etc.), privileged (e.g., attorney-client, work product, etc.), non-privileged, etc. In addition, or alternatively, tags can be automatically selected by the system (e.g., reviewed, not reviewed, presented for review, reviewer's name, review date, review time, review device, etc.).

Figure 13:
FIGS. 13 and 14 provide exemplary screen shots for setting up an account with a host device or host software operating on a local device in accordance with various embodiments of the present invention.
Figure 14:

For example, as shown in FIGS. 13 and 14, the system should be able to control (and identify) who has access to the system and data stored thereon (or accessible therefrom). This may be by accomplished by requiring an individual (e.g., during setup, login, etc.) to provide identifying information, such as name, company, phone number, address, security information (e.g., password, security question, etc.), etc. This information may be used by the system to identify the individual, and thereby monitor the reviewer's activity (e.g., tag files as reviewed by a particular reviewer, etc.), limit accessibility, etc. For example, certain individuals may only have access to a particular case, data from a particular device, data on particular topics, etc.

While tagging can be accomplished in a number of ways, FIG. 4A illustrates one embodiment of the present invention, where search results are provided in a first column, and tags are provided in a second column 408. For each record, the reviewer may be able to access a pull-down menu 410 and select from a plurality of tags. For example, the first record 404a has been identified as "Privileged" 406a, the second record 404b has been identified as "None," etc. It should be appreciated that the specific manner in which tags are selected (e.g., selecting from a pull-down menu, etc.) is a matter of design choice, and is not a limitation of the present invention.

Figures 4B, 10:
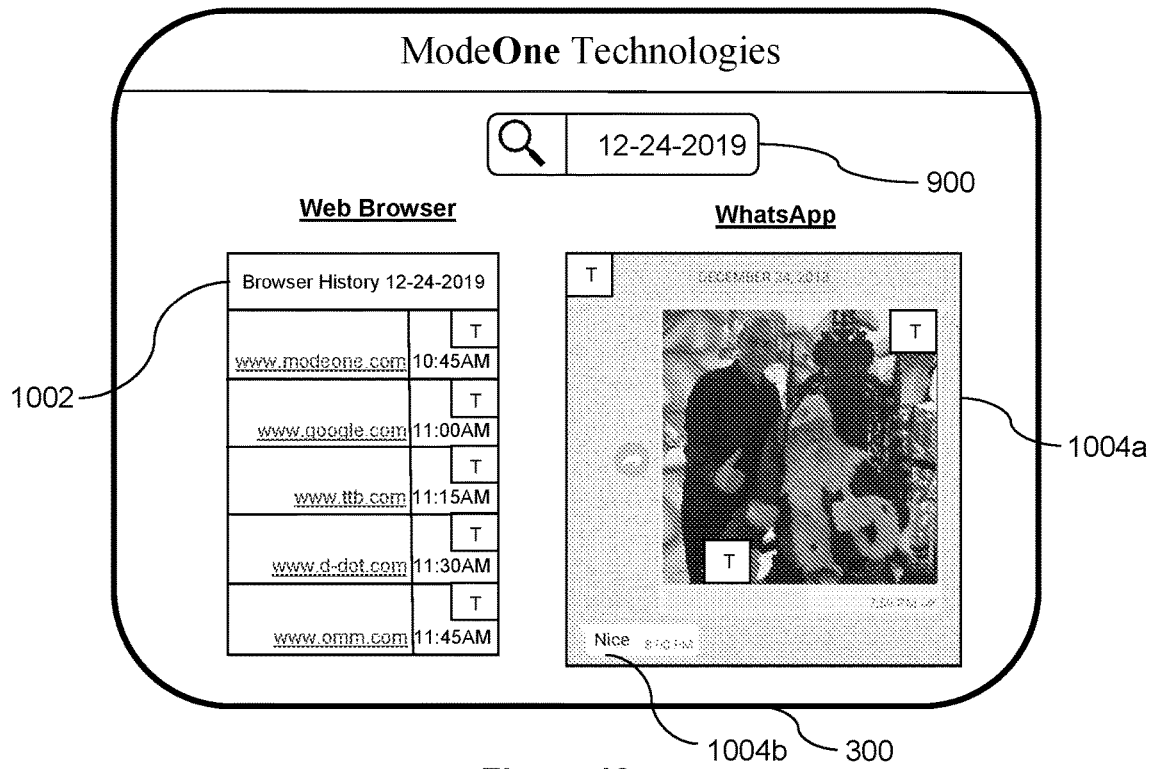
FIG. 4B shows a database in accordance with one embodiment of the present invention, illustrating how tags can be linked to (or associated with) at least one file.
FIGS. 9-12 provide exemplary screen shots of various search results in accordance with various embodiments of the present invention.

Once a tag(s) has been selected, it will then be associated with the record (or collection thereof, see below) for which it was selected. This association can be stored in a number of ways. For example, the meta-data for the record can be modified to include the selected tag(s). This is not preferable, as it alters the data that was originally stored on the mobile device. Thus, a separate database should be created and stored in memory (see, e.g., FIG. 2 at 204) that links (or associates) the tag(s) to the record. As shown in FIG. 4B, this could be accomplished via a database that includes at least one identifier for a record (e.g., a file name 412a, a file location 412b, an associated application 412c, a file ID 412d, etc.) and at least one related tag (e.g., topic 412e, reviewed 412f, reviewer 412g, etc.). Again, the tag(s) could be those selected by the reviewer, or automatically selected by the system. This would allow a reviewer (or the other authorized individual) to subsequently browse, search, filter, and/or report by tag(s).

The identifiers are used (either individually or collectively) to identify a particular record. While each identifier (or certain identifiers) could be created by the system, they are preferably the same identifiers used by the mobile device, thereby leaving the data unaltered or identical to the data stored on the mobile device. For example, the name 412a should be the name of the file (or record) used by the mobile device, the location 412b (e.g., folder, etc.) should be the location of the file on the mobile device, and the ID 412c should be the number(s) used by the mobile device to identify the file. This information may be identified by analyzing the file, extracting information from the file, and/or extracting information from the file's metadata.

In certain instances, the ID alone can be used to distinguish one file from another (see, e.g., Message_1 vs. Message_2). If, however, there are identical IDs, other identifiers (e.g., name, location, application, etc.) may be used, either alone or together with the ID, to uniquely identify a particular file. For example, while Photo_1 may have the same ID (1234) as Message_1, they have different names, locations, and applications. Thus, name+location could be used to uniquely identify each file, application+ID could be used to uniquely identify each file, etc., all of which are within the spirit and scope of the present invention.

Some records may also have more than one ID (not shown in FIG. 4B). For example, a text message may have a message_1D and a thread_1D, where the latter identifies a particular thread (or back-and-forth communications between at least two individuals) and the prior identifies the record within the thread. Thus, while different text messages may have the same thread_1D, and different text messages may have the same message_1D, no two messages (from the same application) have the same thread_1D+message_1D. Thread and Message IDs are preferably assigned to each record by the mobile device or the application for which the record is associated. Those skilled in the art will understand that regardless of which identifier (or combination thereof) is used to uniquely identify each record, the unique identifier can then be used to link (or associate) individual records with at least one tag.

Figure 5:
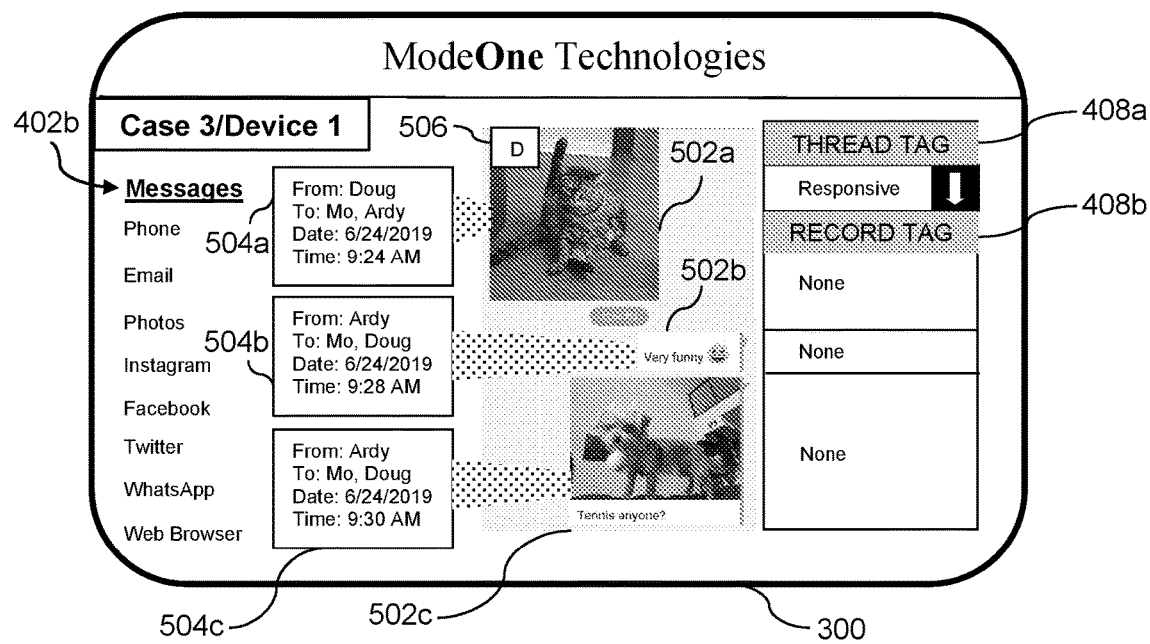
FIG. 5 provides an exemplary screen shot of message data in accordance with one embodiment of the present invention.

As shown in FIG. 5, if the reviewer selects the "messages" category or application 402b, they will be presented with message data, which may include individual threads having individual records or messages (502a, 502b, 502c). The reviewer should also be provided with information on each record, including, but not limited to, the record's content (text, emojis, photos, video, etc.), to, from, date, time, read, unread, etc. This information may either be presented along with each record or separately (e.g., in a pop-up window). While the records are preferably organized chronologically, other structures are within the spirit and scope of the present invention.

For example, the first record 502a (identified as from Doug, to Mo and Ardy) was sent on Jun. 24, 2019, at 9:24 AM, the second record 502b (identified as from Ardy to Mo and Doug), was sent at 9:28 AM, and the third record 502c (identified as from Ardy to Mo and Doug), was sent at 9:30 AM. By presenting a message in this fashion (i.e., showing messages that preceded and succeeded the message in the thread), the message is presented in context and may make more sense to the reviewer. This may include messages that have been deleted (see e.g., "D" at 506) by the user of the device. This is because, while a user may "delete" a message, which results in the message being "flagged" so that it is not displayed on the mobile device, the message may still exist in memory and is therefore retrievable by the system. Such information (e.g., deleted, file size, thread_ID, message_ID, etc.) may be extracted from the file and/or extracted from the file's metadata.

As with phone records, a reviewer may be allowed to select at least one tag from a plurality of tags for each message. However, at least one tag may also be selected for the entire thread. For example, the whole back-and-forth between Doug, Ardy, and Mo may be privileged. Thus, instead of marking each message (or record), the entire thread could be tagged as privileged 406a. However, if only certain messages (or records) are privileged, then those records could be tagged, leaving the entire thread untagged (or at least untagged with respect to the issue of "privilege").

Figure 6:
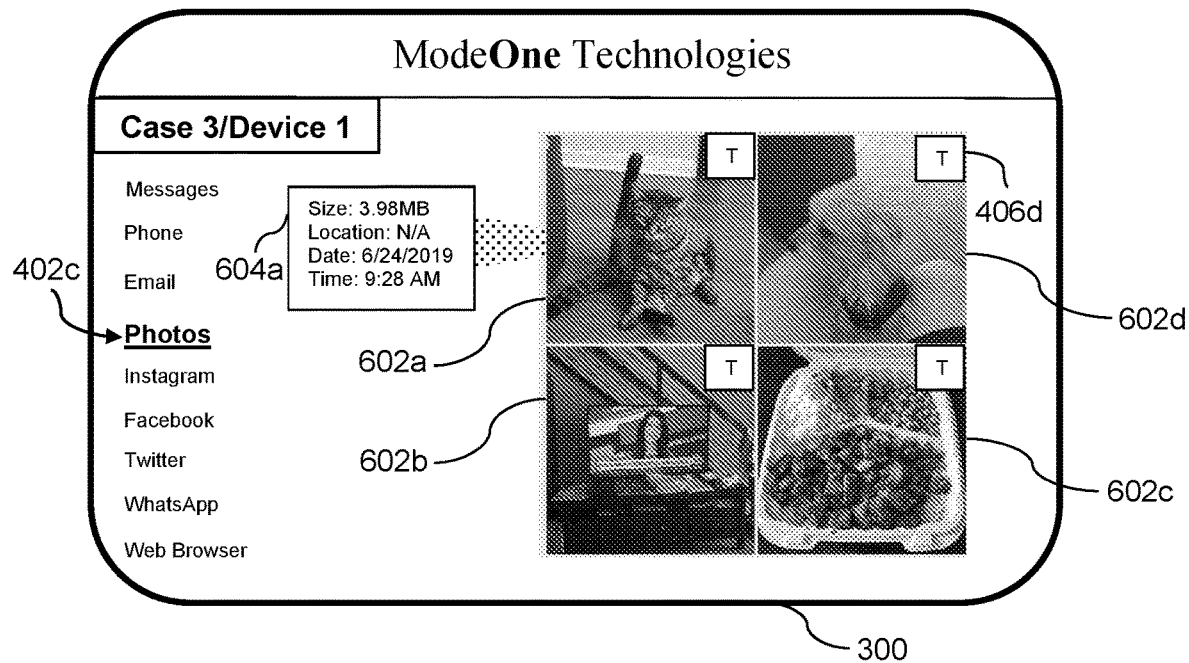
FIG. 6 provides an exemplary screen shot of photo data in accordance with one embodiment of the present invention.

As shown in FIG. 6, if the reviewer selects the "photos" category or application 402c, they will be presented with photo data, which may include individual photos or records (602a, 602b, 602c, 602d). The reviewer should also be provided with information on each record, including, but not limited to, the record's content, size, location, date, time, whether the photo was edited, whether the photo was sent to anyone, and if so, to whom and when, etc. This information may either be presented along with each record or separately (e.g., in a pop-up window). Again, while the records are preferably organized chronologically, other structures are within the spirit and scope of the present invention.

FIG. 6 illustrates an alternate way that "tags" can be presented to a reviewer, i.e., as a box 406d that overlays (or is adjacent to) a corresponding record 602d. The reviewer could designate a "tag" by selecting a box (e.g., by clicking on it, etc.) and selecting at least one tag (e.g., using a pull-down menu, etc.).

Figure 7:
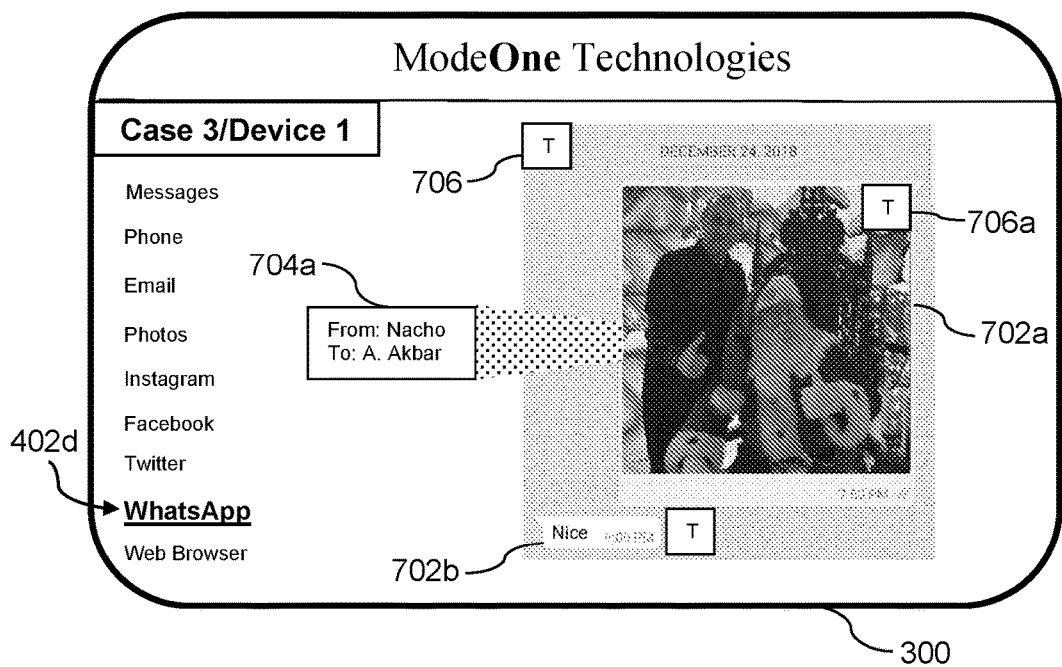
FIG. 7 provides an exemplary screen shot of social media data (e.g., WhatsApp) in accordance with one embodiment of the present invention.

As shown in FIG. 7, if the reviewer selects a social media application, such as "WhatsApp" 402d, they will be presented with data for that application, which may include photos 702a, messages 702b, or other data created, received, or shared using the application. With each record, the reviewer should be provided with information including, but not limited to, the record's content, if it was received, from who, if it was shared, to who, if it was created (or edited), how, when any of the foregoing events took place (date, time), etc. This information may either be presented along with each record or separately (e.g., in a pop-up window). Again, while the records are preferably organized chronologically, other structures are within the spirit and scope of the present invention. Like message data, social media data can be tagged, either individual (e.g., 706a), or as a group or thread (e.g., 706). This is because social media data is similar to message data, where there are back-and-forth communications between at least two people.

As with messages, each record may include multiple IDs, allowing the system to identify the record and at least one thread from which it belongs. Because IDs are preferably created by the mobile device, or an application operating on the mobile device, whether a record has one ID or multiple IDs, is dependent on the application at issue. Twitter may handle records differently than Facebook. It is up to the system to recognize the application at issue and organize data for that application accordingly. Similarly, some application store data locally (on the mobile device) and others store data remotely (e.g., in a cloud). Again, it is up to the system to recognize the application at issue and retrieve data for that application accordingly. If the data is stored on the mobile device, the data can be retrieved from the device itself. If, however, portions of the data are stored in a cloud, portions that are stored on the device (e.g., user credentials, such as user name, password, etc.) may be retrieved from the device, and portions that are stored on the cloud may be retrieved from the cloud, where the latter (access to the cloud) may require the former (e.g., acquiring user credentials).

As previously discussed, a reviewer may browse the data by selecting a category or an application and scrolling through portions of the data (i.e., data for that category). Alternatively, or in addition, a reviewer may search for a search term (e.g., name, subject, date, period of time, etc.). Results may include records that match or are closely related (e.g., similar, etc.) and may be performed globally (i.e., on all the data) or on individual categories or applications.

Figures 8, 9:
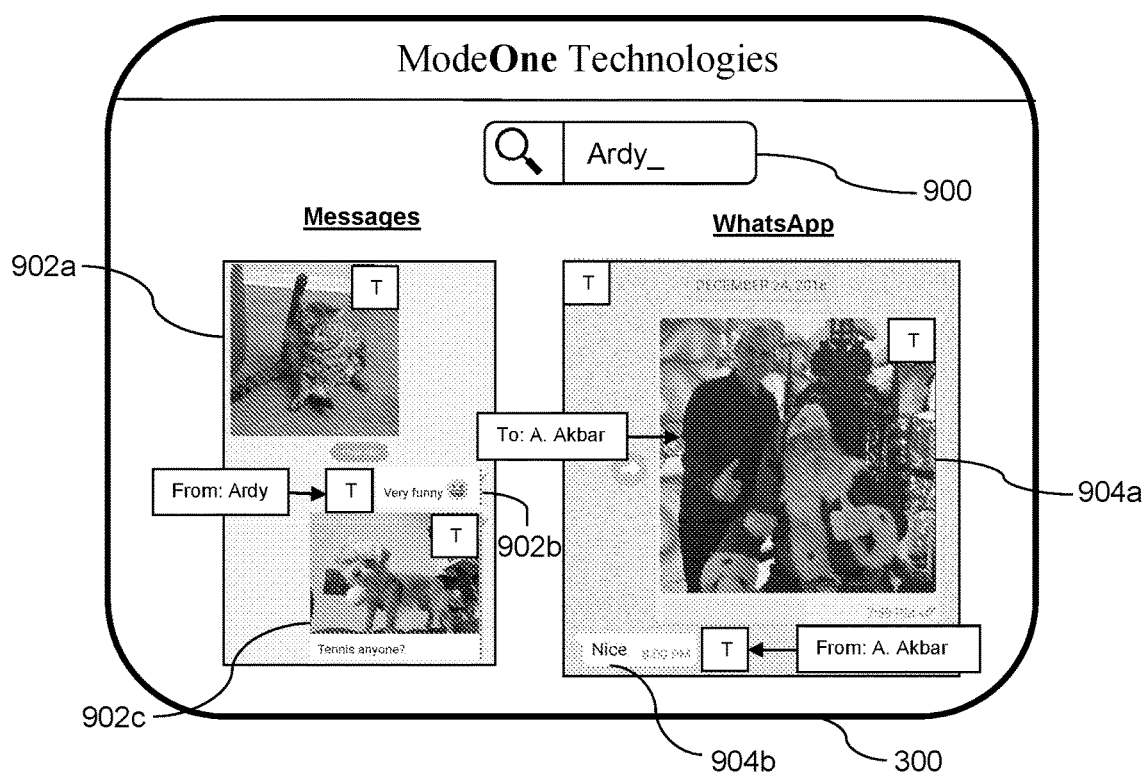
FIG. 8 shows a database in accordance with one embodiment of the present invention, illustrating how various fields (e.g., name, phone, email, etc.) can be used to identify an individual and to link different user names together.

For example, as shown in FIG. 9, if a reviewer enters the name "Ardy" in a search field 900, then the system may provide search results, which may be from one application or many applications. For example, by not selecting an application, all data stored on the mobile device may be searched. If, however, the reviewer only wants to see results from a particular application, then they could select that application before entering the search term.

Figure 16:
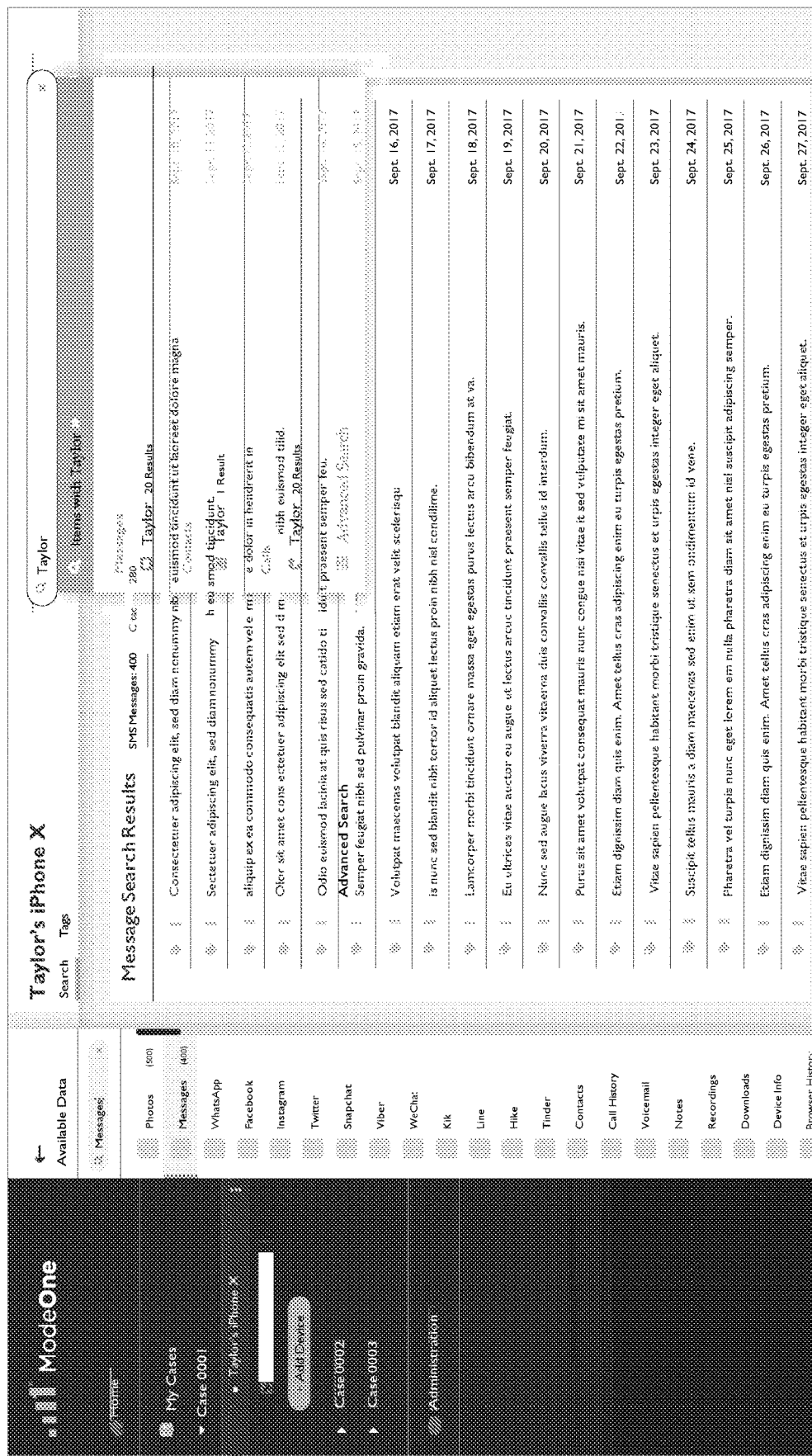
FIGS. 16 and 17 provide exemplary screen shots of various search results in accordance with various embodiments of the present invention.
Figure 17:
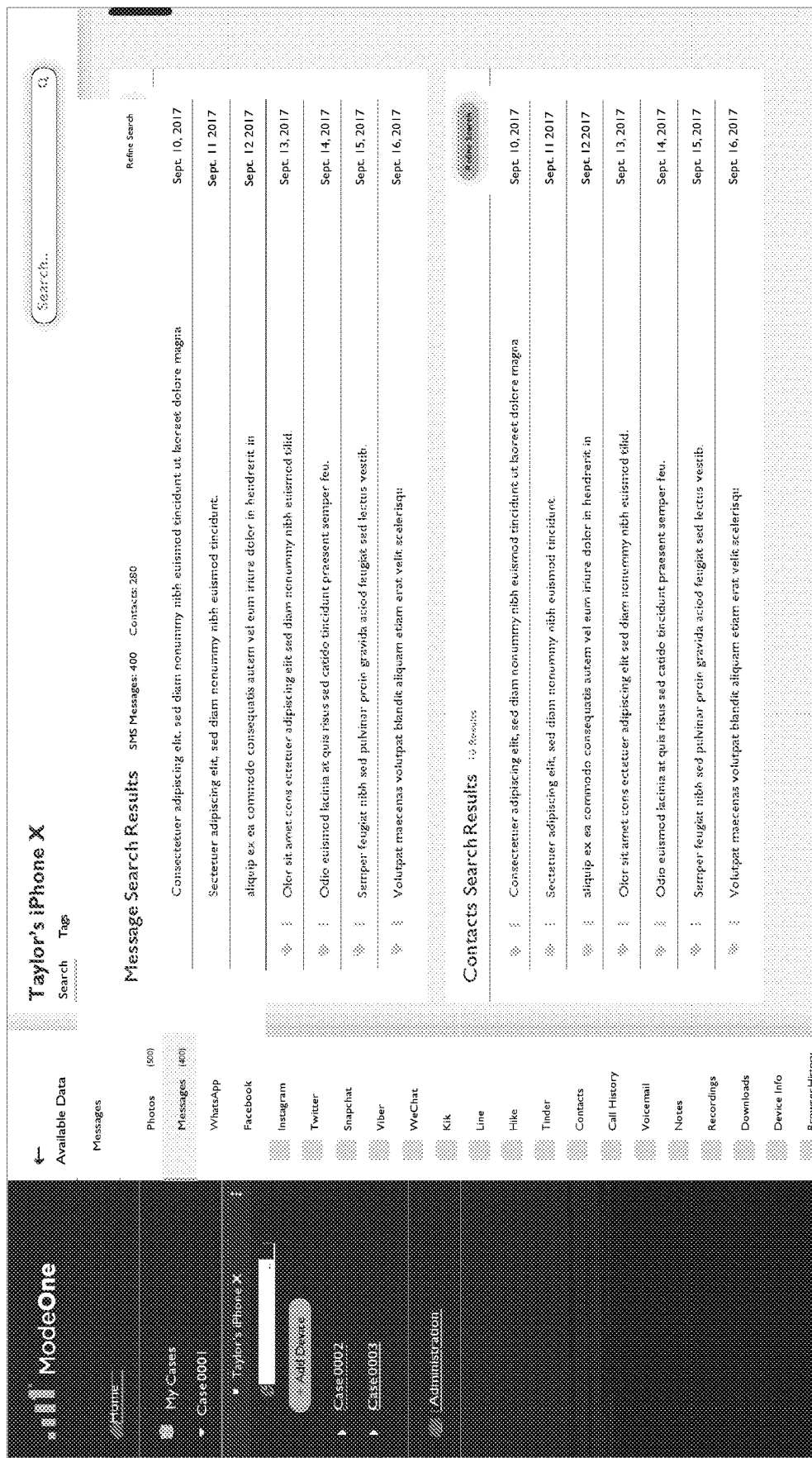
Figure 18:
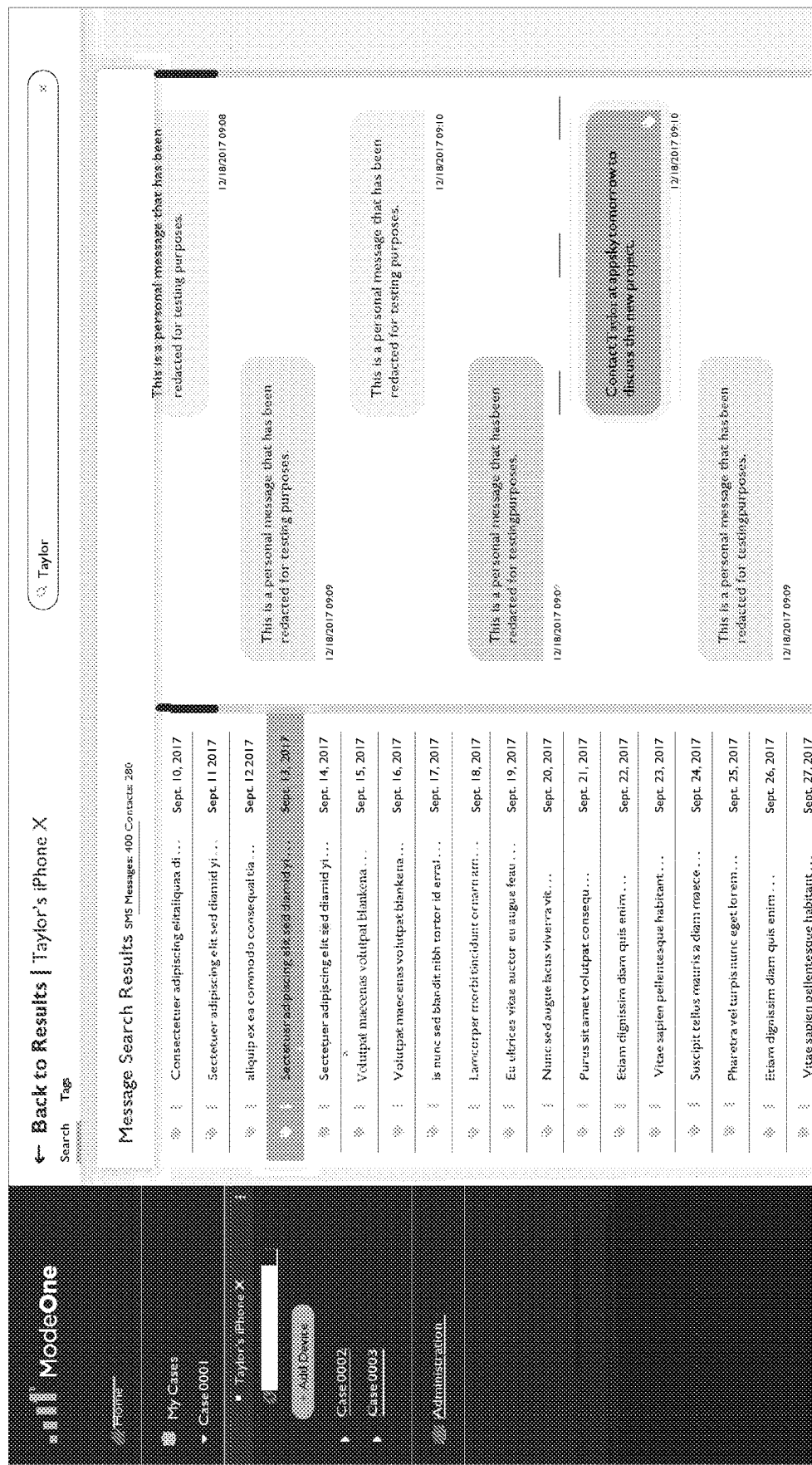
FIG. 18 provides an exemplary screen shot, illustrating how message data may be presented in accordance with one embodiment of the present invention.

This can be seen, for example, in FIG. 16, where the reviewer is searching the message application for the term "Taylor." The system may then present the reviewer with matching messages. The system may also identify other applications that includes matching records (e.g., including the number of matches, etc.). If no application is selected, the system may present results from multiple applications. See, e.g., FIG. 17. Regardless of how the results are displayed, if the reviewer selects a record, the system may present the reviewer with additional information on the record. For example, as shown in FIG. 18, if a message is selected, the system may present the message content along with other information (e.g., date, etc.), including other records in the thread (e.g., preceding and/or succeeding).

In one embodiment of the present invention, the system may include a "story telling" feature, where data related to a search result (or record) is presented to the reviewer in order to provide context. For example, if the record 902b is responsive to a search term, then the system may provide other records related to that search term. This may include records that precede and succeed the record in the same application (i.e., 902a, 902c). Such records may be identified using the record's thread ID (identifying records that have the same thread ID) and message ID (identifying records that have message IDs that precede and succeed the record's message ID). This may also include records from another application that are related to the search result. This may include records that match or are similar to the search term, from the same person to the same person, include similar subject matter, took place immediately before, after, within the same hour, within the same day, etc.

This can be seen, for example, in FIG. 10, where a search result for Dec. 24, 2019, includes both a WhatsApp record for that day and the web browser's history for that day. This could be the result of searching for a term in the data (globally) or searching for a term in WhatsApp, with the "story telling" feature selected, indicating a desire for the system to identify records that are deemed related.

For example, during a criminal investigation, the messaging application on a suspect's mobile device could be searched for the victim's name. The "story telling" feature could be used to provide the reviewer with information on what the suspect was doing immediately before the communication, immediately after the communication, other communications with the suspect, etc. It may be that the suspect went to Google and searched for "identity theft" immediately after their last communication with the victim. Executing this feature may involve more than just searching different applications for the same data (e.g., same search term).

For example, assume that system is searching for "Ardy." The system may identify text messages that are to or from Ardy (see, e.g., FIG. 5) and social media involving Ardy (see, e.g., FIG. 7). However, the system may also be configured to collect and organize information concerning Ardy, which may be extracted from various applications and/or records. For example, as shown in FIG. 8, a contact record on Ardy (802a) (stored on the mobile device) may include his phone number (802b), his email address (802c), and his mailing address (802d), and other records stored on the mobile device may include other identifiers, such as government issued IDs (802e) (e.g., driver's license, social security number, etc.), financial information (802f) (e.g., Visa, Paypal, Zelle, bank accounts, etc.), etc. While processing the data stored on the mobile device, the system may also learn that some of these identifiers (e.g., email, phone, etc.) are linked to user_name A Akbar (802g) on WhatsApp, to user_name Camp Clown on Facebook, etc. This collection of information (i.e., database 800) can then be used to identify related records. This can be seen in FIG. 9, where a search for "Ardy" pulls up records concerning "Ardy" and records concerning "A. Akbar."

By way of another example, a search for "Ardy" may result in a text message from Ardy at 9:00 PM on Sep. 9, 2012, to both Doug and Mo, concerning a bank robbery. The system may then present the text message to the reviewer along with related records (e.g., side-by-side, etc.), where the related records are identified by searching the data (e.g., globally, by application, etc.) for a second search term that is extracted from the first search term's search result (i.e., the text message). This could be for records that concern Doug and/or Mo, are from the same date/time (i.e., 9:00 PM on Sep. 9, 2012) (or shortly before or after), involve the same subject matter (e.g., bank robbery), etc.

Again, the system could be configured to do this automatically or at the request of the reviewer (e.g., by selecting the "story telling" feature). This feature could be used to identify related records in different applications, including the web browser, which may include, but is not limited to, websites visited, date/time/duration of visited, website credentials (e.g., user name, password), website activity (e.g., postings, purchases, downloads, etc.), searches, search results, cookies, etc.

Figure 11:
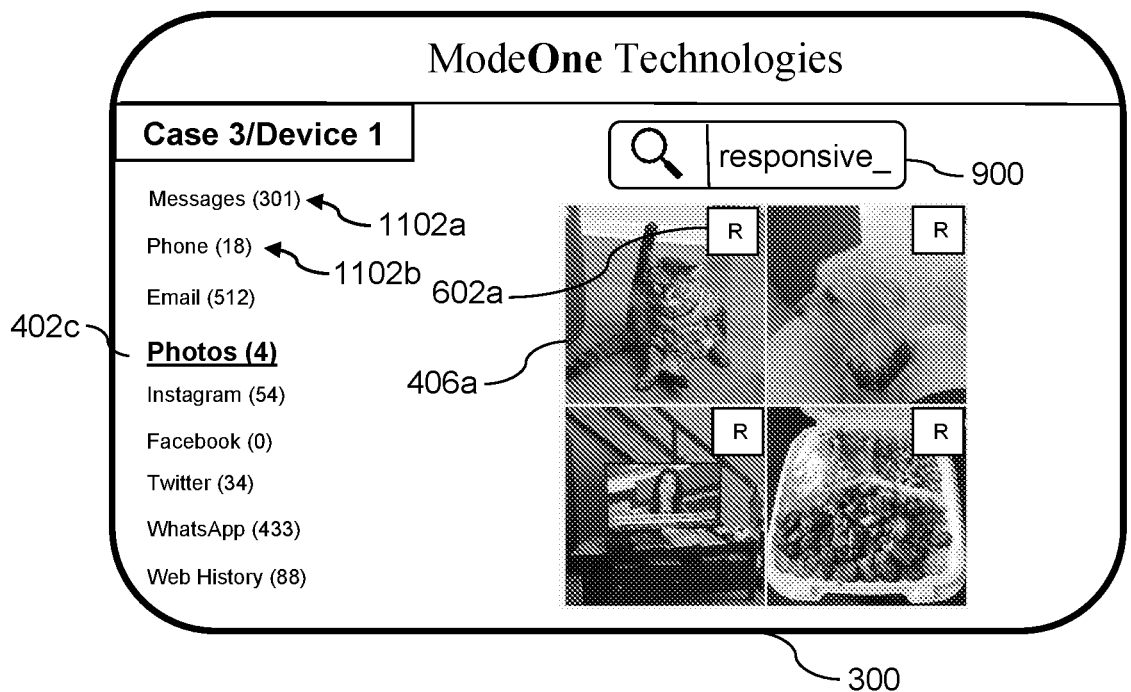

When reviewing the data, it may be necessary to understand the number of search results for a search term. For example, as shown in FIG. 11, a reviewer may want to search the data for files that have been tagged as "responsive." A search for this tag may result in the system identifying the number of search results in each category or application. In FIG. 11, there are only four photos that were tagged "responsive." With messages, however, there are 301 records that were tagged as "responsive." By knowing the number of search results (e.g., per category, etc.), it allows the reviewer to understand the nature/extent of the search results. This is extremely important when reviewing mobile data, which may not have a logical beginning or end. A search, for example, could result in reviewing data having a date that is older than some, newer than others, leaving a reviewer wondering if there were files that have not yet been reviewed.

Figure 12:
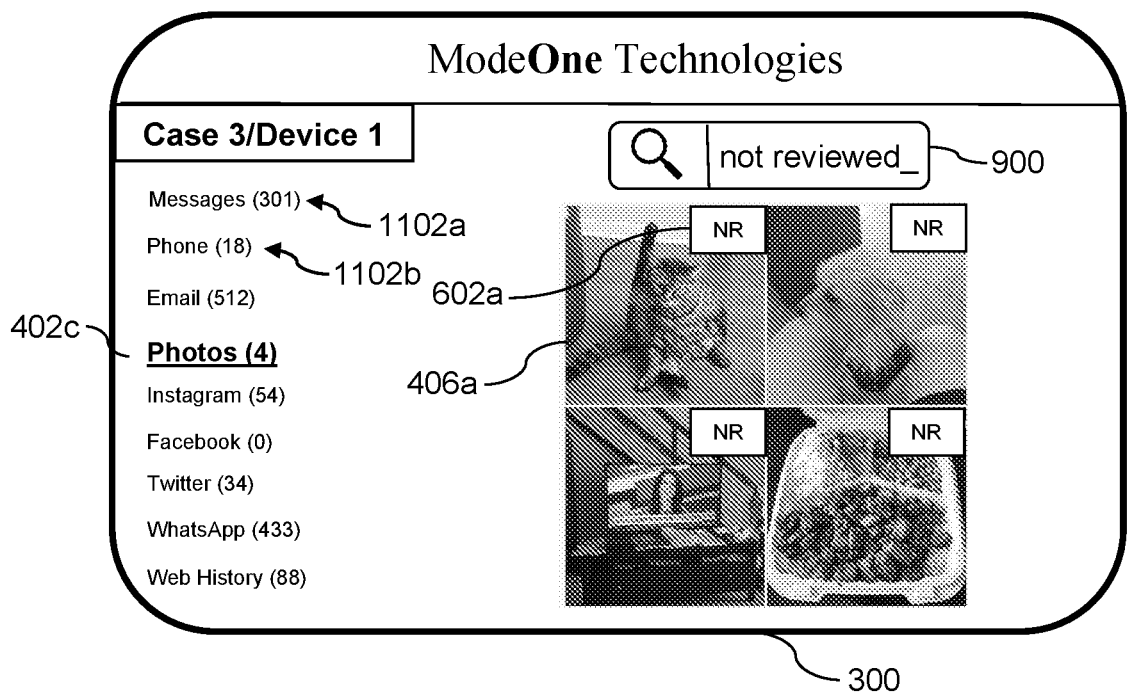

As shown in FIG. 12, a reviewer could search for the tag "not reviewed," which is a tag that may be generated automatically by the system based on whether a record has or has not been presented to the reviewer (e.g., displayed), read, tagged, included in a search result, etc. This would allow a reviewer to "tie up loose ends" by reviewing data that was not responsive to any search or was not encountered while browsing. This can very easily be the case if the categories are folders. Anyone who has ever connected their mobile phone to a computer in order to search for a file will understand that files are not always easy to locate. For example, some photos (ones taken by the user) may be in a first folder, whereas others (ones shared by others) may be in a second folder. Thus, the feature illustrated in FIG. 12 can be used to ensure that a thorough review of the data has been conducted, and that all records have been reviewed, or as least presented to the reviewer for review.

It should be appreciated that other tags may also be selected automatically by the system, including who reviewed the data, when the data was reviewed, action that was taken during the review, etc. Other tags may be more substantive, such as comments, allowing the review to provide comments on each record or on a compilation thereof. The reviewer may also be allowed to annotate the data (e.g., highlight text, etc.). However, it is preferred that such annotations be stored separately from the data, allowing the original data to remain unaltered. The annotations could be stored in a database (see, e.g., FIG. 4B), and could be stored as instructions (e.g., highlight the phrase "where shall we meet"). During a subsequent viewing of the record, the record could be presented in its original form (e.g., if annotations are turned off) or as annotated (e.g., if annotations are turned on), where the record is re-annotated (based on the instructions) at the time it is being presented. In an alternate embodiment, a copy of the record as annotated could be stored in the database. During a subsequent viewing of the record, the original record could be presented (e.g., if annotations are turned off) or the duplicate (annotated) record could be presented (e.g., if annotations are turned on). By creating a duplicate record, the original record remains unaltered.

Figure 19:
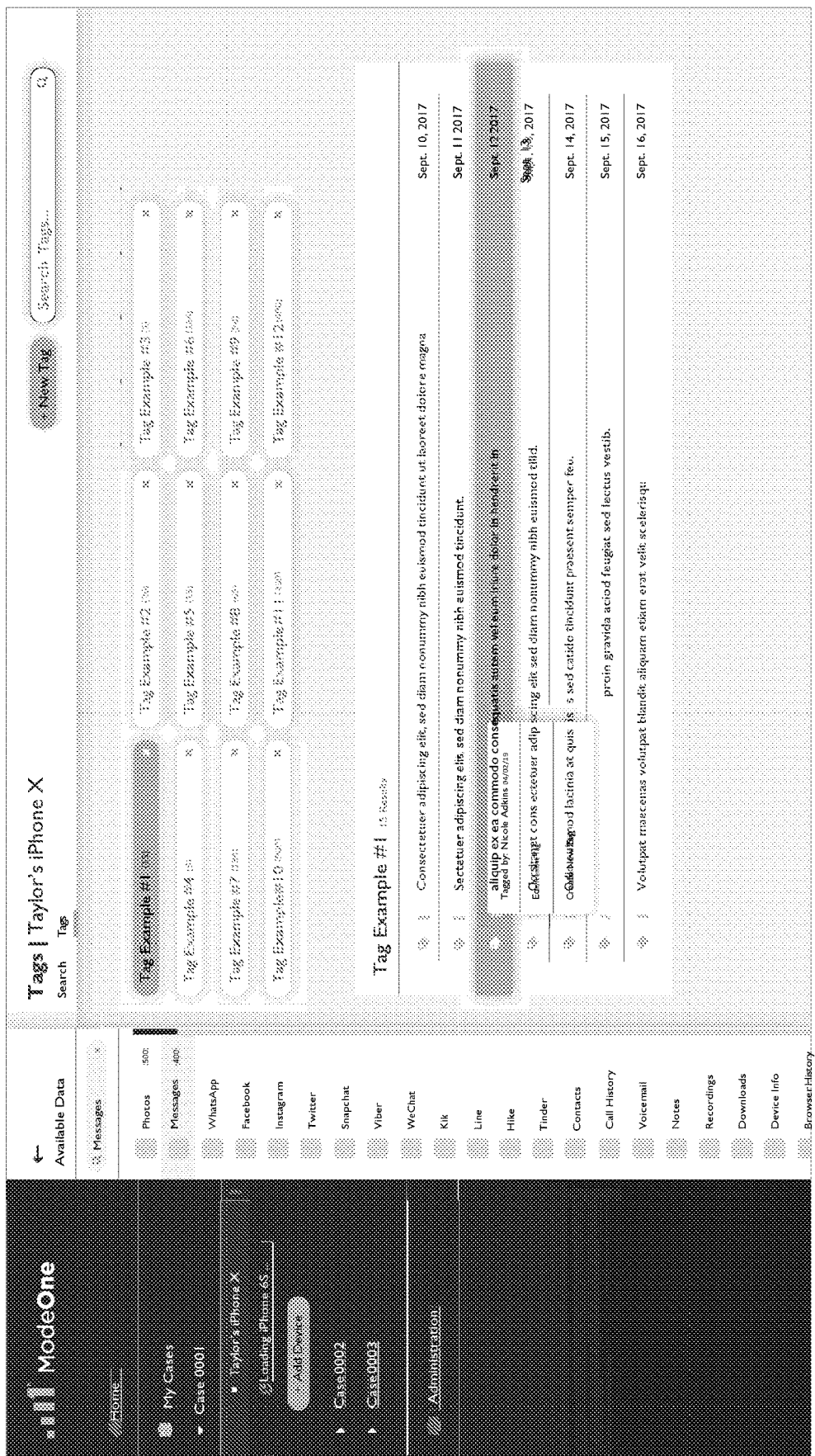
FIG. 19 provides an exemplary screen shot of search results in accordance with one embodiment of the present invention.
Figure 20:
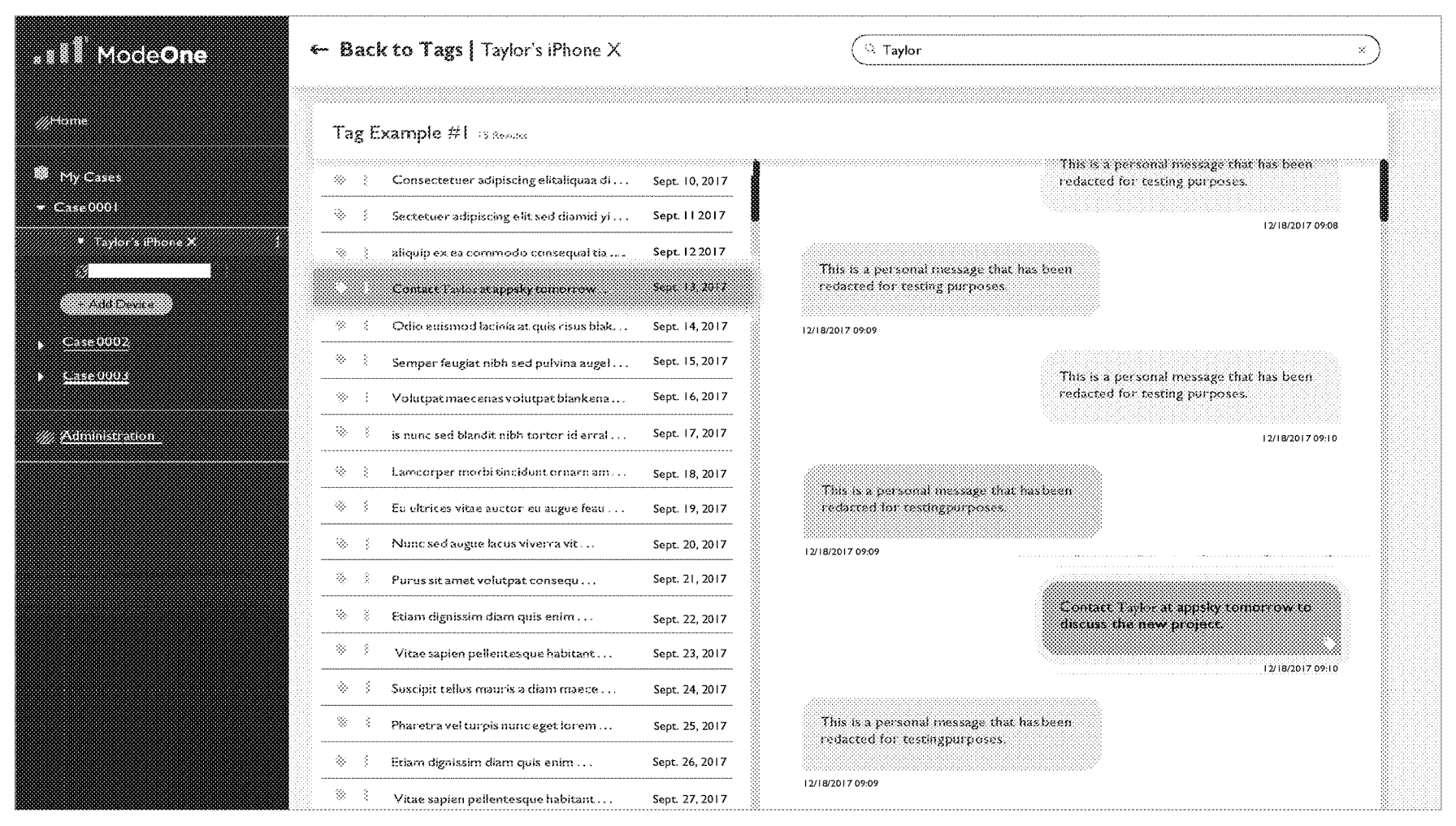
Figure 21:
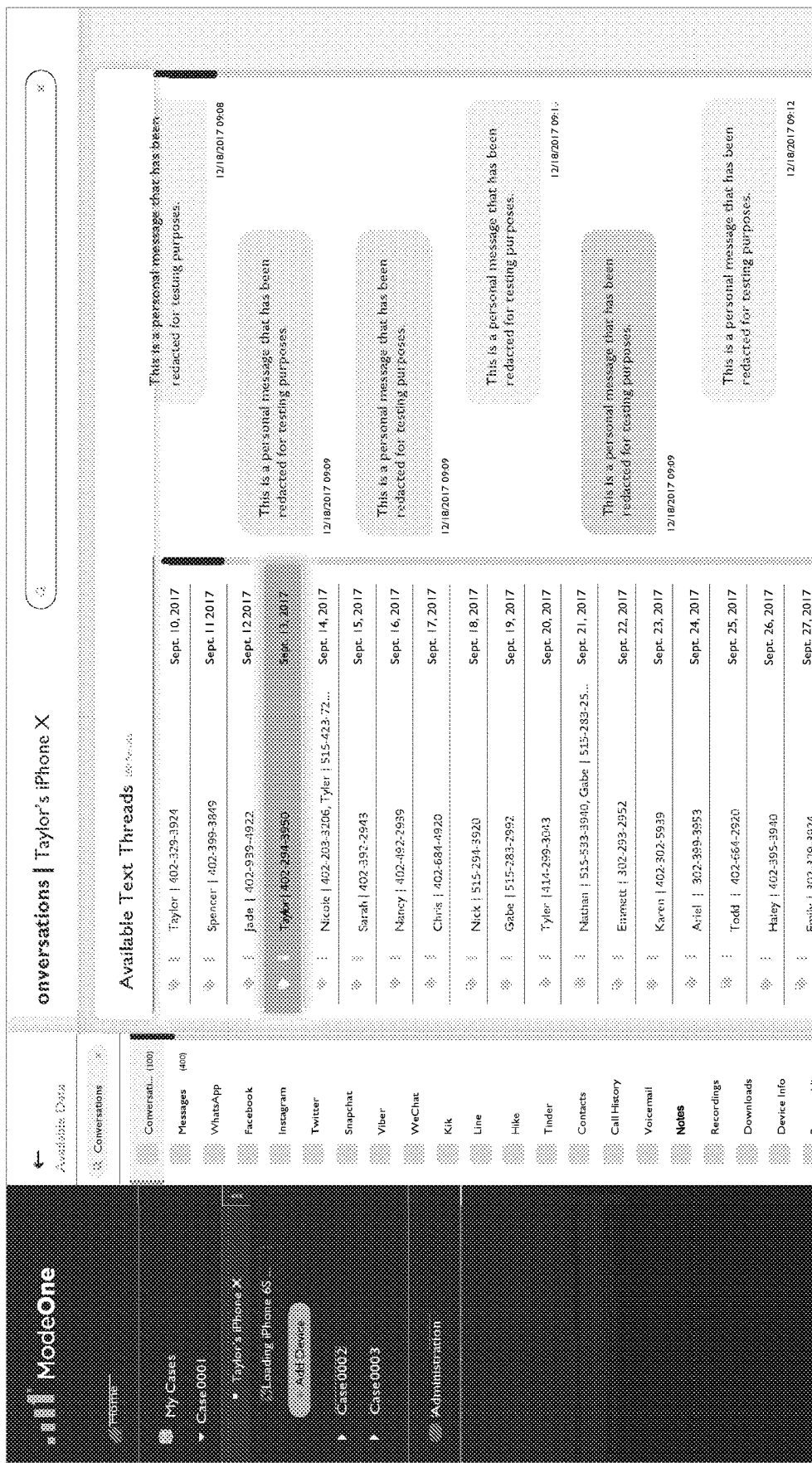

It should also be appreciated that tags can also be browsed. See, e.g., FIG. 19. For example, if a particular tag (e.g., privileged) is selected, records associated with that tag would be presented to the reviewer. As before, if a record is then selected, information on that record may be provided to the reviewer. If the record is a message, that may include the text message itself, the date/time it was received, and other messages in the same thread. See, e.g., FIG. 20. It should further be appreciated that collective groups of records can also be browsed (or searched). For example, as shown in FIG. 21, a reviewer may be allowed to browse threads from a message application. If a thread is selected, the messages (or records) from the thread may be presented to the reviewer (e.g., in chronological order).

Figure 22:
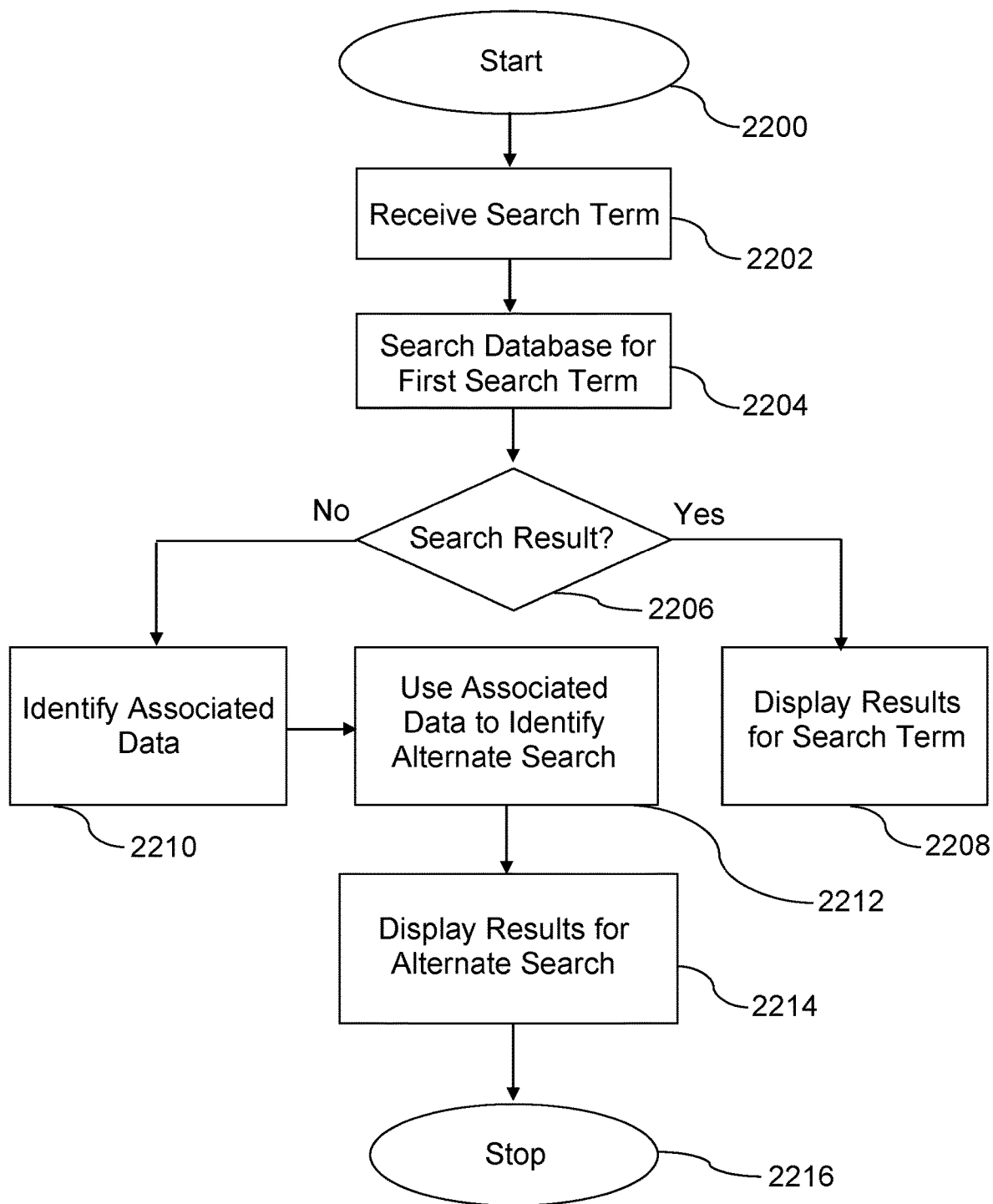
FIG. 22 illustrates a method in accordance with one embodiment of the present invention that uses at least one search term to identify results from different applications.

A method of identifying records that match (or are related) to a search term in accordance with one embodiment of the present invention is shown in FIG. 22. Starting at step 2200, a search term is received at step 2202. As discussed above, this could be anything of relevance, ranging from a name, to a date (or range), to a tag, or other data or metadata that may be of interest. At step 2204, records are identified that match or closely resemble (e.g., abbreviations, etc.) the search term. If records are identified at step 2206, then the search results are presented to the reviewer at step 2208. If, however, records are not identified at step 2206, then data associated with the search term is identified at step 2212. For example, if the search term is a name of an individual, then data associated with that individual may include a date of birth, phone number, email address, physical address, government issued ID (e.g., social security number, driver's license number, etc.), financial information (banking information, etc.), etc. This data can then be used to identify an alternate name (e.g., an alternate user name, etc.), or in the case of a generic search term, an alternate search term (e.g., for a Visa number, a linked Mastercard number could be used; for a driver's license number, a linked Social Security Number could be used; etc.) at step 2212. Records that match the alternate search term can then be displayed at step 2214, ending the method at step 2216.

It should be appreciated that the present invention is not limited to the method illustrated in FIG. 22, and that methods that include additional, fewer, or different steps are within the spirit and scope of the present invention. For example, regardless of whether there are search results at step 2206, alternate search results could be identified at step 2214 (e.g., if the system is so configured, if the "story telling" feature is turned on, etc.), and presented to the reviewer. By way of another example, the alternate data (itself) could be used to identify search results. For example, search results for John could also include search results for John's date of birth, email address, phone number, etc. By way of another example, search results for a first term could also include search results for a second term, where the first and second terms are synonyms, one is a root and the other further includes a prefix, further includes a suffix, is a plural form of the root, etc.

Having thus described several embodiments of a system and method for receiving, analyzing, and organizing data stored on a mobile communication device, and presenting that data in a user-friendly fashion, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. A web host for analyzing, organizing, and presenting data stored on a mobile communication device, comprising:
    a server adapted to receive the data from the mobile communication device, the data comprising at least one of a first set of records for a first application and a second set of records for a second application;
    at least one memory device in communication with the server and adapted to store the data; and
    at least one program operating on the web host, the at least one program being adapted to:
        receive a first search term;
        search the first set of records for the first search term to identify a thread comprising at least one matching record, the at least one matching record having a record identifier and a thread identifier;
        use the record identifier and the thread identifier to identify a preceding record in the thread and a succeeding record in the thread;
        search the second set of records to identify at least one other record that is associated with the first search term; and
        generate a webpage, the webpage including at least the preceding record, the at least one matching record, and the succeeding record, in that order, and the other record.

2. The web host of claim 1, wherein the first application allows a user of the mobile communication device to communicate with at least one other user via at least one other mobile communication device.

3. The web host of claim 1, wherein the at least one memory device is further adapted to store at least one tag, wherein the at least one tag is selected from a plurality of tags available to a reviewer of the data and linked to individual portions of the data.

4. The web host of claim 3, wherein at least one of the plurality of tags can be selected for the at least one matching record, the preceding record, the succeeding record, the at least one other record, and the thread, and wherein selection of the at least one tag for a corresponding record results in the at least one tag being linked to the corresponding record in the at least one memory device, and selection of the at least one tag for the thread results in the at least one tag being linked to the thread in the at least one memory device.

5. The web host of claim 1, wherein the server is adapted to receive the data from the mobile communication device via at least one intermediate device connected to a wide area network (WAN).

6. The web host of claim 1, wherein the first search term comprises a name of an individual, and the matching record comprises a text message that comprises at least one of (i) to the individual, (ii) from the individual, and (iii) mentions the individual.

7. The web host of claim 1, wherein the step of searching the second set of records comprises searching the second set of records for the first search term to identify at least one other matching record.

8. The web host of claim 1, wherein the step of searching the second set of records comprises (i) using a link that is common to both the first search term and a second search term to identify the second search term, and (ii) searching the second set of records for the second search term to identify the at least one other record, the second search term matching the at least one other record.

9. The web host of claim 8, wherein the link comprises at least one of a user name, a phone number, an email address, an address, a government issued identifier, and financial information.

10. The web host of claim 1, wherein the search term comprises a temporal range, and the record comprises a text message that was at least one of sent and received during the temporal range.

11. A method for analyzing, organizing, and presenting data stored on a mobile communication device, comprising:
    receiving the data from the mobile communication device via a wide area network (WAN), the data comprising at least one of a first set of records for a messaging application and a second set of records for a second application;
    storing the data in at least one memory device;
    making the data available to a reviewer;
    receiving a first search term from the reviewer;
    searching the first set of records for the first search term to identify a thread comprising at least one matching record, the at least one matching record having a record identifier and a thread identifier;
    using the record identifier and the thread identifier to identify a preceding record in the thread and a succeeding record in the thread;
    searching the second set of records to identify at least one other record that is associated with the first search term; and
    sending a webpage to the reviewer, the webpage including at least the preceding record, the at least one matching record, and the succeeding record, in that order, and the at least one other record, thereby providing the reviewer with context for the at least one matching record.

12. The method of claim 11, further comprising the step of storing at least one tag in the at least one memory device, wherein the at least one tag is selected from a plurality of tags available to the reviewer linked to individual portions of the data, and wherein at least one of the plurality of tags can be selected for the at least one matching record, the preceding record, the succeeding record, the at least one other record, and the thread.

13. The method of claim 12, wherein selection of the at least one tag for a corresponding record results in the at least one tag being linked to the corresponding record in the at least one memory device, and selection of the at least one tag for the thread results in the at least one tag being linked to the thread in the at least one memory device.

14. The method of claim 11, wherein the step of receiving the data comprises receiving the data from the mobile communication device via at least one intermediate device connected to the WAN.

15. The method of claim 11, wherein the step of searching the second set of records comprises searching the second set of records for the first search term to identify at least one other matching record.

16. The method of claim 11, wherein the step of searching the second set of records comprises searching the second set of records for a second search term to identify at least one other matching record, the second search term being associated with a link that is also associated with the first search term, wherein the link comprises at least one of a user name, a phone number, an email address, an address, a government issued identifier, and financial information.

17. The method of claim 11, wherein the step of receiving a first search term comprises receiving a temporal range, the record being a text message that was sent or received during the temporal range.

18. A system for reviewing data stored on a communication device, comprising:
a server adapted to receive the data, the data comprising a first set of records for a messaging application and a second set of records for a second application;
a memory adapted to store the data; and
at least one program adapted to:
receive a first search term from a data reviewer;
search the first set of records for the first search term to identify a thread comprising at least one matching record, the at least one matching record having a record identifier and a thread identifier;
use the record identifier and the thread identifier to identify a preceding record in the thread and a succeeding record in the thread;
search the second set of records to identify at least one other record that is associated with the first search term; and
display to the reviewer at least the preceding record, the at least one matching record, the succeeding record, and the other record, at the same time.

19. The system of claim 18, wherein the at least one program is further adapted to identify a second search term that is an alternative to the first search term.

20. The system of claim 19, wherein the step of searching the second set of records comprises searching the second set of records for the second search term to identify at least one other matching record.

* * * * *